Sept. 6, 1927.

T. E. GILES

MEASURING INSTRUMENT

Filed Oct. 3, 1925

1,641,266

Inventor
Theodore E. Giles
by Roberts Roberts & Cushman,
Att'ys

Patented Sept. 6, 1927.

1,641,266

UNITED STATES PATENT OFFICE.

THEODORE E. GILES, OF PORTLAND, OREGON, ASSIGNOR TO SIMONDS SAW AND STEEL COMPANY, OF FITCHBURG, MASSACHUSETTS, A CORPORATION OF MASSACHUSETTS.

MEASURING INSTRUMENT.

Application filed October 3, 1925. Serial No. 60,308.

This invention relates to an improvement in a slide-gauge or caliper-rule adapted conveniently and quickly to measure the dimensions of lumber and other objects.

The invention comprises a frame having an upstanding jaw integral therewith and a sliding bar movable therein, the sliding bar being provided with an upstanding jaw corresponding to and cooperating with the first mentioned jaw to determine the limits of the object to be measured, the space between said jaws being calibrated accurately to show the extent thereof. Disposed in the lower end of the frame and below the sliding bar is a slide member having an upper inclined surface acting against an opposed inclined surface of a gib located between the lower end of the sliding bar and the upper end of the slide member, a thumb piece being provided on said slide to enable it to be easily actuated. Teeth are provided on the adjacent surfaces of the sliding bar and gib which are adapted to mesh and retain said sliding bar in a locked position when the slide is moved into locking position. Ordinarily the sliding bar is freely movable with respect to the frame but the bar may be locked against movement by a slight actuation of the slide.

In the sawing of lumber and the mass production of other objects of specific dimensions it is necessary that said lumber and other objects produced be constantly measured in order to be sure that they are of correct dimensions according to prescribed specifications. This necessitates considerable labor due to the awkward gauges heretofore available making the work of measuring the objects produced slow and cumbersome. Gauges heretofore known have not been so easy to manipulate as to enable a person to operate the gauge with one hand while the other hand is free to handle the object to be measured. To operate the gauge with one hand and have the other hand free to handle the material to be measured greatly facilitates this work with the result that a great saving in time and labor is effected.

Objects of this invention, therefore, are to provide a gauge so conveniently arranged and constructed to permit it being readily operated to measure objects with the use of one hand, to provide a gauge easily manipulated and positively locking the jaws of the gauge against relative movement when desired; and to provide a gauge very simple in its construction and inexpensive in its manufacture.

Other objects of the invention will be manifest from the detailed description and claims appended hereto.

A practical embodiment of the invention is represented in the accompanying drawings forming a part of this specification in which:—

Figure 1:
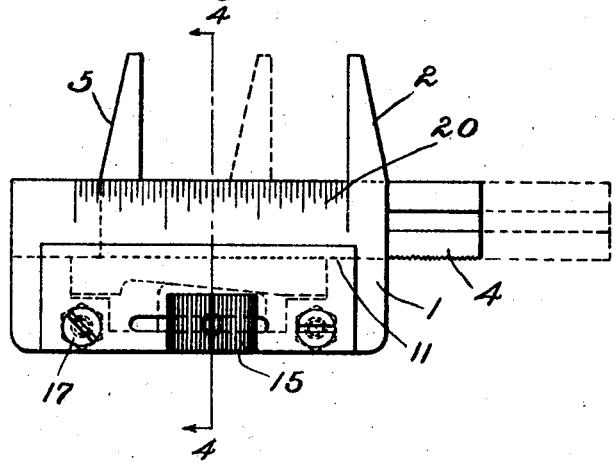
Fig. 1 is a front elevational view of the device forming this invention.
Figure 2:
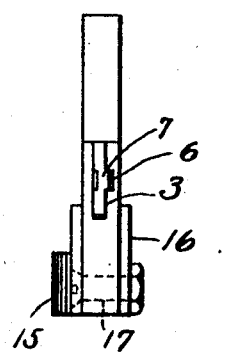
Fig. 2 is an end elevational view at right angles to the view shown in Fig. 1.
Figure 3:
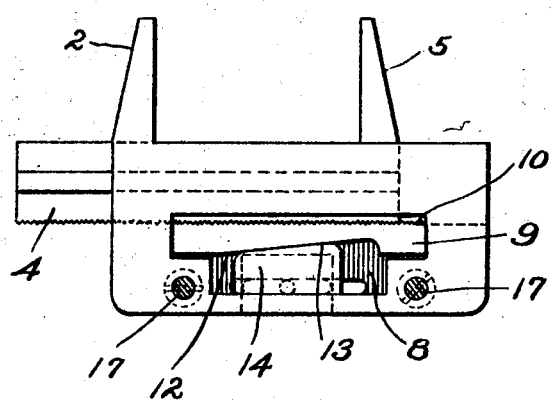
Fig. 3 is a rear elevational view of the device opposite the view shown in Fig. 1 with the side plate removed.
Figure 4:
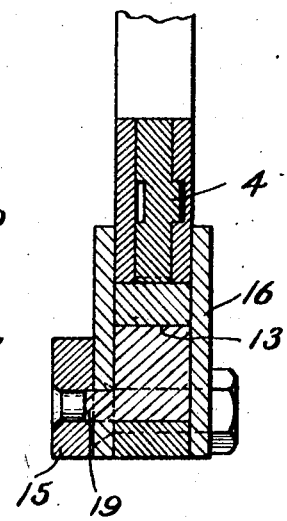
Fig. 4 is a section on the line 4—4 of Fig. 1.

As illustrated in the drawing the numeral 1 designates the frame or body of the gauge having an upstanding jaw 2 and a recess 3 therein, below said jaw, adapted to receive a sliding bar element 4 having an upstanding jaw 5 cooperating with the first mentioned jaw 2 to define the limits of the object to be measured. A slot 6 is located in one side wall of the recess 3 and is adapted to receive the lip 7 on the sliding bar 4 so that said bar will be definitely positioned relative to said recess and the body or frame member. The body or frame member 1 has a cut away portion 8 in its lower end below the sliding bar 4 in which is positioned a gib 9 having teeth 10 on its upper surface adapted to mesh with teeth 11 located on the lower surface of the sliding bar 4. The lower surface 12 of the gib member 9 is tapered to cooperate with an oppositely tapered surface 13 on the slide member 14, a thumb piece 15 being provided on said slide member to permit actuation thereof. Side plates 16 are attached to opposite sides of the frame member 1 closing the sides of the cut away portion 8 and being retained in position by suitable screws 17. A slot 18 is located in one of the side plate members 16 adjacent the thumb piece 15 to permit movement of the pin 19 therein which fastens said thumb piece to the slide member. A scale 20 is formed on the frame member 1 and the sliding bar member 4 to show at a glance the exact distance separating the jaws 2 and 5.

The operation of the device is as follows: The object to be measured is inserted between the jaws 2 and 5, said jaw 5 carried by the movable slide member 4 being readily adjustable relative to the jaw 2 to permit the object being received. The jaws 2 and 5 now define the dimensional limits of the object therein and this dimension is accurately determined by referring to the scale measuring the distance between said jaws. By now using the thumb or a free finger on the hand holding the gauge, the piece 15 may be actuated, causing the gib 9 to be raised so that the teeth 10 thereon mesh with teeth 11 on the sliding bar positively locking it in position. The object between the jaws 2 and 5 may now be withdrawn with the gauge locked in a position showing the exact dimension of said object.

I claim:

1. A measuring device adapted to be held in the hand of the user comprising a frame having a fixed jaw, a bar carrying a jaw corresponding to and cooperating with the first-mentioned jaw, said bar being adjustable in said frame, a scale on said frame measuring the distance separating said jaws, a gib adapted to engage said bar, interengaging teeth on the bar and gib respectively, and a locking piece slidable longitudinally of the gib and operable by the thumb of the hand in which the device is held to lock and unlock the bar against movement relative to the frame.

2. In a measuring instrument comprising an elongate body having a fixed jaw and a recess extending longitudinally thereof, a bar slidable in said recess having a jaw corresponding to and cooperating with said first mentioned jaw and having teeth on its lower portion, said body also having a recess in its lower portion, a gib in said last mentioned recess having teeth on its upper surface and a lower inclined surface, a slide member having an upper inclined surface slidable in said last mentioned recess and engaging said gib to raise it upwardly when actuated, so that the teeth on the upper surface of the said gib will mesh with the teeth on the lower surface of the slidable bar to lock said bar in position.

3. In a measuring instrument comprising an elongate body having a fixed jaw and a recess extending longitudinally thereof, a bar slidable in said recess having a jaw corresponding to and cooperating with said first mentioned jaw and having teeth on its lower portion, the body also having a recess in its lower surface, a gib in said last mentioned recess having teeth on its upper surface and a lower inclined surface, a slide member having an upper inclined surface slidable in said last mentioned recess and engaging said gib to raise it upwardly when actuated so that the teeth on the upper surface of said gib will mesh with the teeth on the lower surface of the slidable bar to lock said bar in position, and a side plate attached to said body and adapted to hold the gib and slide member in place within the recess of said body.

4. A measuring gauge comprising a body having a jaw thereon, a slidable bar having a jaw opposed to said first jaw, said bar extensible beyond said body in one direction, and a slidable lock movable by the thumb of the hand which holds the device to lock said bar in adjusted position and to unlock it whereby, while grasping the extended portion of said bar with the hand with the thumb overlapping said body adjacent said thumb-piece, the body may be pushed along the bar until said jaws engage the opposite surfaces of the object to be measured and then by permitting the thumb to engage the thumb-piece the parts may be locked with the jaws maintained in position.

Signed by me at Seattle, Washington, this twenty-third day of September, 1925.

THEODORE E. GILES.